United States Patent

Miura et al.

[11] Patent Number: 5,816,762
[45] Date of Patent: Oct. 6, 1998

[54] STUD CLIP HAVING DIFFERENT INSERTION/WITHDRAWAL FORCES

[75] Inventors: Hideya Miura; Mitsuru Kogami, both of Yokohama, Japan

[73] Assignee: Illinois Tool Works Inc., Glenview, Ill.

[21] Appl. No.: 677,217

[22] Filed: Jul. 9, 1996

[51] Int. Cl.[6] .............................. F16B 37/08; F16B 37/16
[52] U.S. Cl. ........................... 411/433; 411/437; 411/908
[58] Field of Search ..................... 411/433, 437, 411/267, 270, 512, 908

[56] References Cited

U.S. PATENT DOCUMENTS

| | | | |
|---|---|---|---|
| 4,671,717 | 6/1987 | Fukuhara | 411/437 X |
| 4,828,444 | 5/1989 | Oshida | 411/437 |
| 4,934,889 | 6/1990 | Kurosaki | 411/512 X |
| 4,999,019 | 3/1991 | Kraus | 411/437 X |
| 5,302,070 | 4/1994 | Kameyama et al. | 411/437 X |

Primary Examiner—Neill R. Wilson
Attorney, Agent, or Firm—Schwartz & Weinrieb

[57] ABSTRACT

A stud clip adapted for mounting upon an upstanding threaded bolt or stud comprises a pair of oppositely disposed latch members having a plurality of claw or detent portions defined thereon for engaging the threaded shank portion of the stud or bolt. The latch members may have a predetermined thickness, or may be tapered, in order to provide the stud clip with a relatively low or small insertion force, however, in order to concomitantly provide the stud clip with a relatively high or large retention, removal, or withdrawal force, spring members are provided adjacent to the latch members so as to bias the latch members into forceful engagement with the threaded shank portion of the stud or bolt once the stud clip is mounted upon the stud or bolt, or alternatively, once the stud or bolt is inserted into the interior cavity of the stud clip. The spring members are initially spaced from the latch members, until the stud or bolt expand the latch members radially outwardly into engagement with the spring members, so as not to interfere with or compromise the relatively low or small insertion force.

20 Claims, 2 Drawing Sheets

STUD CLIP HAVING DIFFERENT INSERTION/WITHDRAWAL FORCES

FIELD OF THE INVENTION

The present invention relates generally to stud clips, and more particularly to a clip which is particularly adapted for mating with a threaded bolt or stud, which is affixed to a base member, such as, for example, an automobile body, so as to secure an attachment member, such as, for example, a sheet, panel, or block of heat insulation material, to the automobile body.

BACKGROUND OF THE INVENTION

Stud clips are of course well known in the art, and an exemplary stud clip is disclosed within FIG. 4 of the drawings of the present patent application which corresponds to Japanese Utility Model Publication SHO 61-52710. More particularly, as disclosed within the noted drawings and the patent publication, the automobile body is shown at B, and a threaded bolt or stud S is affixed to body B by means of its flange f by any suitable means, such as, for example, welding. A sheet, panel, or block of heat insulation material is shown at A, and it is seen that the block of insulation material has a recessed portion d defined therein. The recessed portion d of the block of heat insulation material A is also provided with an aperture h so as to permit the upstanding threaded bolt or stud S to be inserted therethrough.

The stud clip is generally indicated by the reference character 1 and is seen to comprise an outer housing 11 and two sets of oppositely disposed latch members or detents 21. The housing 11 further includes a lower wall 12 within which is defined a through-aperture 12h so as to permit the housing 11 to be mounted over the upstanding threaded bolt or stud S whereby the bolt or stud S projects into the interior cavity 13h of the housing 11 such that the latch members or detents 21 can engage the threaded portion e of the bolt or stud S. The aperture 12h includes a chamfered portion 12d which accommodates the flanged portion f of the upstanding bolt or stud S, and an upper wall 14 of the housing 11 is provided with a through-aperture 14h which is coaxially aligned with the through-aperture 12h of the lower wall 12 so as to permit the upper free end of the stud or bolt S to be disposed therein or pass therethrough. Each one of the sets of latch members or detents 21 comprises a vertically tiered set of four members or detents 21 which engage the threaded portion e of the bolt or stud S, and it is seen that the latch members or detents 21 are integrally formed with the housing 11 such as, for example, by means of a suitable molding process wherein the entire housing unit may be fabricated from a suitable synthetic resin material.

In use, after the stud or bolt S has been suitably affixed to the automobile body B, the block of heat insulation material A is inserted over the upstanding stud or bolt S such that the threaded shank of the bolt or stud S is inserted through the through-aperture h of the insulation material A as defined within the recessed portion d of the insulation material A. The stud clip 1 is then used to secure or affix the block of insulation material A to the automobile body B. Accordingly, the clip 1 is disposed within the recessed portion d of the insulation material A and is inserted over the upstanding free end of the threaded bolt or stud S such that the free distal end of the threaded bolt or stud S is inserted through the through-aperture 12h defined within the lower wall 12 of the clip housing 11 whereby the threaded shank portion of the stud or bolt S is disposed within the interior cavity 13h of the clip housing 11 and the lower wall 12 of the housing 11 is disposed in contact with that portion of the block of insulation material A which defines the bottom region of the recessed portion d. As the upstanding shank portion of the bolt or stud S is inserted into the interior cavity 13h of the housing 11, the threaded shank of the bolt or stud S encounters the latch members or detents 21 and causes them to be moved or expanded radially outwardly. Conversely, due to the inherent elasticity of the flexible and resilient latch members or detents 21, the latter engage the threaded shank of the bolt or stud S such that the clip 1 is fixedly retained upon the bolt or stud S so as in turn to fixedly secure the block of insulation material A upon the automobile body B.

While the conventional or PRIOR ART stud clip 1, disclosed within FIG. 4 of the present patent application drawings and as described hereinbefore, obviously functions sufficiently well in order to stay retained upon the threaded bolt or stud S so as to in turn maintain, for example, the block of insulation material A affixed to the automobile body B, both the insertion force required for attaching or mounting the stud clip 1 upon the threaded bolt or stud S, as well as the removal force required for releasing the stud clip 1 from the threaded bolt or stud S, are dependent upon or are direct functions of the thickness, and therefore, the rigidity, of the latch members or detents 21. Consequently, if the latch members or detents 21 are fabricated so as to be relatively thin, the insertion force is desirably reduced or relatively low, however, the removal force is also undesirably reduced or relatively low. Alternatively, if the latch members or detents 21 are fabricated so as to be relatively thick, while the removal force may be desirably increased or relatively high, the insertion force is also undesirably increased or relatively high. It has thus been difficult to fabricate a stud clip wherein the insertion force is desirably reduced or relatively low while the removal force is desirably increased or relatively high, and a need therefore exists in the art for a stud clip which can function as intended and also exhibits the desired insertion force and removal force parameters or characteristics.

OBJECTS OF THE INVENTION

Accordingly, it is an object of the present invention to provide a new and improved stud clip for mating with a threaded stud or bolt, fixedly mounted upon a base member, so as to retain an attachment or material member fixed upon the base member.

Another object of the present invention is to provide a new and improved stud clip which overcomes the various disadvantages and drawbacks characteristic of the prior art stud clips conventionally employed in connection with threaded bolts or studs affixed to base members.

A further object of the present invention is to provide a new and improved stud clip wherein the insertion force characteristic thereof is relatively low while the removal force characteristic thereof is relatively high.

SUMMARY OF THE INVENTION

The foregoing and other objectives are achieved in accordance with the present invention through the provision of a new and improved stud clip wherein the clip comprises a pair of oppositely disposed latch members and wherein each one of the latch members comprises multiple or tiered claws for engaging the threaded shank portion of the stud or bolt. The base portion of each latch member is fabricated so as to be thinner than the distal claw end of the latch member such that the insertion force is reduced or rendered relatively small. A spring member is also operatively associated with each one of the latch members in such a manner that the spring members and the latch members are initially or normally spaced from each other, that is, when the stud clip is not mounted upon the threaded bolt or stud. However, when the stud clip is mounted upon the threaded bolt or stud such that the threaded shank of the bolt or stud is inserted into the interior cavity of the stud clip so as to expand the latch members radially outwardly, the latch members encounter the spring members whereby the spring members enhance or supplement the normal resilient force of the latch members by means of which the latch members normally engage the threaded shank of the bolt or stud when such spring members are not present, as in the prior art or conventional stud clips, so that the resulting engagement force, which is characteristic of the removal force of the stud clip with respect to the threaded bolt or stud, is substantially increased.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
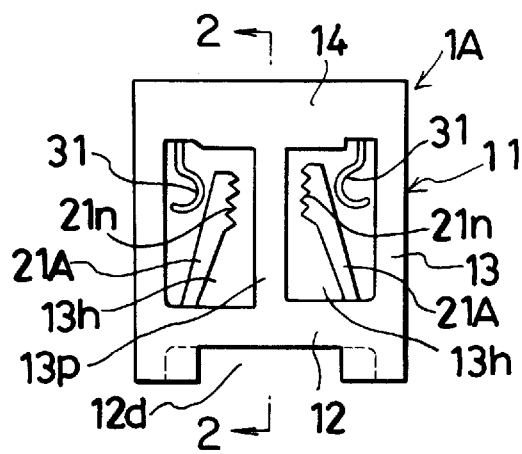
FIG. 1 is a front elevational view of a new and improved stud clip constructed in accordance with the teachings of the present invention and showing its cooperative parts.
Figure 2:
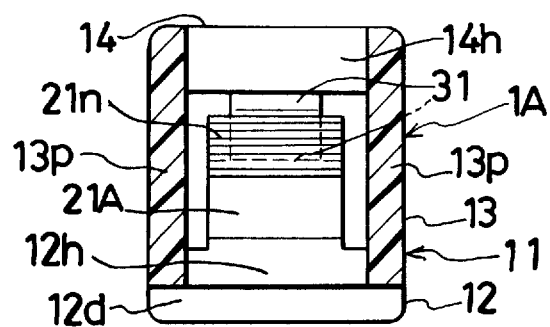
FIG. 2 is a cross-sectional view of the new and improved stud clip of the present invention as shown in FIGURE 1 and as taken along the line 2—2 of FIG. 1.
Figure 3:
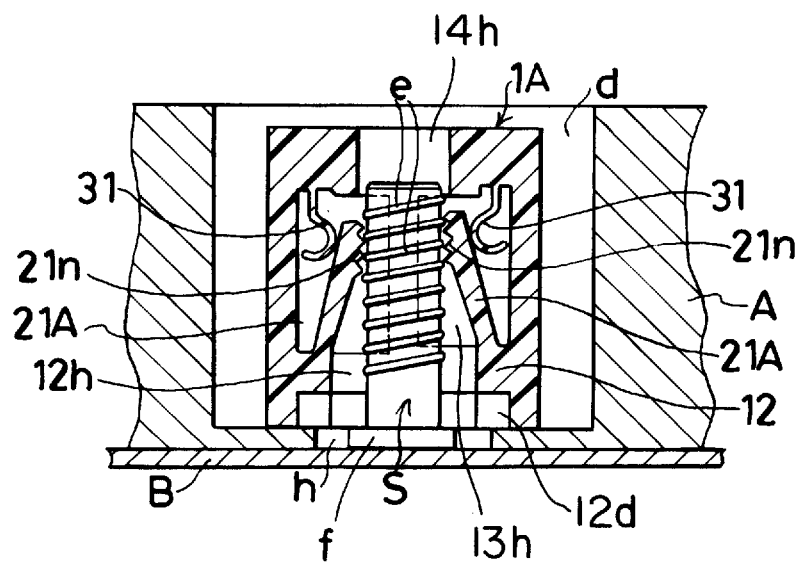
FIG. 3 is a cross-sectional view of the new and improved stud clip of the present invention as shown in FIGURE 1 and shown in use for retaining and securing an attachment or material member upon an automobile vehicle body.

Referring now to the drawings, and more particularly to FIGS. 1–3 thereof, the new and improved stud clip constructed in accordance with the present invention is generally indicated by the reference character 1A and is seen to comprise a housing 11, a pair of oppositely disposed latch members 21A integrally formed with a lower wall 12 of housing 11, and a pair of spring members 31 integrally formed with an upper wall 14 of housing 11 and disposed within the vicinity of the latch members 21A such that the latch members 21A and the spring members 31 are normally spaced from each other when the stud clip is not mounted upon a threaded stud or bolt as seen in FIG. 1 but are in engagement with each other, when the clip 1A is mounted upon the threaded bolt or stud S and the latch members 21A engage the threaded shank portion e of the bolt or stud S, as a result of the threaded bolt or stud S expanding the latch members 21A radially outwardly. It is seen that each latch member 21A is tapered such that the thickness thereof gradually increases as it extends from its proximal end which is affixed to the lower wall 12 of the housing 11 to its distal end upon which a plurality of claws or detents 21n are provided. In particular, four claws or detents 21n are provided upon each one of the latch members 21A. Housing 11, latch members 21A, and spring members 31 may be readily molded from a suitable synthetic resin material. Housing 11 further includes peripheral side wall 13 having a support pillar 13p.

Figure 4:
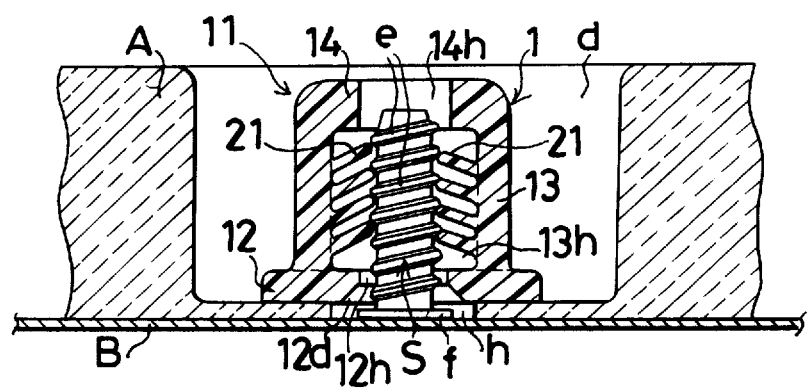
FIG. 4 is a view similar to that of FIG. 3 showing however a conventional PRIOR ART stud clip when the same is used to secure and retain an attachment or material member upon an automobile vehicle body.

With particular reference now being made to FIG. 3, use of the new and improved stud clip 1A of the present invention will now be described in connection with the attachment or fixation of an attachment member A to a base member B wherein the attachment member A may be, for example, a block, sheet, or panel of heat insulation material and the base member B may be an automobile body. As was the case in connection with the PRIOR ART stud clip shown in FIG. 4, the threaded stud or bolt S is first fixed to the automobile body B by any suitable means, such as, for example, welding, and the heat insulation material A, having a through-aperture h defined within a bottom region of a recessed portion d, is mounted upon the automobile body B such that the upstanding threaded bolt or stud S is inserted through the through-aperture h and the bolt or stud S projects or extends into the recessed portion d. The stud clip 1A is then mounted upon the upstanding threaded bolt or stud S so as to affix and retain the heat insulation material A upon the automobile base member or body B. More particularly, the lower wall 12 of the stud clip 1A is disposed toward the bottom region of the recessed portion d of the heat insulation material A, and the free upstanding or distal end of the stud or bolt S is inserted through the through-aperture 12h defined within the lower wall 12 of the stud clip 1A. The free upstanding or distal end of the stud or bolt S encounters the latch members 21A of the stud clip 1A and upon continued insertion of the threaded shank of the stud or bolt S into the stud clip 1A, the free or distal end of the stud or bolt S expands the latch members 21A radially outwardly.

In view of the fact that the spring members 31 are initially or normally spaced from the latch members 21A, as seen in FIG. 1, that is, when the stud clip 1A has not as yet been applied to or mounted upon the upstanding threaded bolt or stud S, or prior to insertion of the bolt or stud S within the interior cavity 13h of the stud clip 1A, the latch members 21A are permitted to expand radially outwardly under the influence of the mated bolt or stud S in a relatively unrestricted manner such that the insertion force required to insert the bolt or stud S within the cavity 13h of the stud clip 1A and between the latch members 21A, or alternatively, the insertion force required to mount the stud clip 1A upon the threaded bolt or stud S is relatively low. However, upon predetermined insertion of the bolt or stud S into the cavity 13h of the stud clip 1A such that the bolt or stud S encounters the latch members 21A and expands the same radially outwardly into contact with the spring members 31, the inherent resistance characteristic of the spring members 31 causes the latch members 21A to engage the threaded portion e of the bolt or stud S with increased resistance or force whereby the withdrawal or removal force characteristic of the stud clip 1A with respect to the stud or bolt S is substantially enhanced. It is also noted that while a sufficiently high retention, withdrawal, or removal force can be developed by means of the stud clip of the present invention through means of each latch member 21A having only a single claw portion or detent 21n defined thereon, such retention, withdrawal, or removal force is enhanced still further through the provision of the plurality of tiered latch claws or detents 21n. Two or more latch claws or detents 21n may be provided upon each latch member 21A, and the illustrated or preferred embodiment disclosed in FIGS. 1 and 3 discloses four latch claws or detents 21n.

It is further noted in connection with the particularly disclosed embodiment of the stud clip 1A of the present invention that while two oppositely disposed latch members 21A have been disclosed, the invention contemplates the provision of three or more latch members equiangularly disposed in a circumferential array about the interior of the stud clip cavity 13h. Still further, while the latch members 21A are illustrated as being integrally mounted upon the lower wall 12 of the stud clip 1A, the latch members 21A can likewise be integrally mounted upon or project from side wall 13 of the stud clip 1A. Lastly, while the invention disclosure has been directed toward the mounting of a heat insulation block, sheet, or panel structure A upon an automobile base or body member B, the stud clip 1A of the present invention is likewise adapted for use in connection with the mounting of other structures upon other support platforms, substrates, or the like, such as, for example, in connection with pipe, wire, or cable hangers.

Thus it may be seen that by means of the present invention, a new and improved stud clip 1A has been developed whereby the stud clip 1A exhibits a relatively small insertion force, as determined, for example, by means of the tapered structure of each one of the latch members 21A with the thinner portion thereof being attached to the lower wall 12 of the stud clip 1A, as well as the inherent resiliency of the flexible latch members 21A, while also exhibiting a relatively high or large removal, retention, or withdrawal force as determined, for example, by means of the provision and disposition of the spring members 31 in conjunction with the latch members 21A, as well as the tiered sets of latch claws or detents 21n.

Obviously, many modifications and variations of the present invention are possible in light of the above teachings. It is therefore to be understood that within the scope of the appended claims, the present invention may be practiced otherwise than as specifically described herein.

What is new and desired to be secured by Letters Patent of the United States of America, is:

1. A stud clip, comprising:
   a housing having an interior cavity defined therein;
   aperture means defined within a wall of said housing for permitting insertion of a threaded stud bolt into said cavity defined within said housing;
   resiliently flexible, radially expandable latch means disposed within said cavity defined within said housing for engaging said threaded stud bolt and for being expanded radially outwardly to a predetermined extent by said threaded stud bolt when said threaded stud bolt is inserted into said cavity defined within said housing such that said radially outward expansion, of said resiliently flexible latch means to said predetermined extent, determines an insertion force characteristic of said stud clip which is necessary to insert said threaded stud bolt into said cavity defined within said housing; and
   additional means disposed within said cavity defined within said housing for engaging said latch means, resisting further radially outward expansion of said latch means beyond said predetermined extent, and for biasing said latch means with an additional force into engagement with said threaded stud bolt such that said latch means engages said threaded stud bolt with a withdrawal force which is greater than said insertion force determined only by said resiliently flexible latch means.

2. A stud clip as set forth in claim 1, wherein:
said additional means disposed within said cavity defined within said housing comprises spring members disposed adjacent to said latch means.

3. A stud clip as set forth in claim 2, wherein:
said latch means comprises a pair of oppositely disposed latch members; and
said spring members comprises a pair of spring members respectively disposed adjacent to each one of said pair of latch members.

4. A stud clip as set forth in claim 2, wherein:
said housing, said latch members, and said spring members comprise a one-piece molding.

5. A stud clip as set forth in claim 4, wherein:
said housing, said latch members, and said spring members are fabricated from a synthetic resin material.

6. A stud clip as set forth in claim 1, wherein:
said latch means comprises claw means for engaging a threaded portion of said threaded stud bolt.

7. A stud clip as set forth in claim 6, wherein:
said claw means comprises a plurality of claw detents disposed within a tiered array.

8. A stud clip as set forth in claim 3, wherein:
said latch members are secured at first proximal end portions thereof to said wall of said housing.

9. A stud clip as set forth in claim 8, wherein:
said latch members have claw detents defined upon second distal end portions thereof for engaging a threaded shank portion of said threaded stud bolt.

10. A stud clip as set forth in claim 9, wherein:
each one of said latch members has a tapered configuration such that said first proximal end portion is thinner than said second distal end portion.

11. A stud clip as set forth in claim 1, wherein:
said additional means disposed within said cavity defined within said housing are spaced from said radially expandable latch means prior to expansion of said radially expandable latch means, by said threaded stud bolt when said threaded stud bolt is inserted within said housing, into engagement with said additional means.

12. A stud clip, comprising:
a housing having an interior cavity defined therein;
aperture means defined within a wall member of said housing for permitting insertion of a threaded stud bolt into said cavity defined within said housing;
resiliently flexible, radially expandable latch means disposed within said cavity defined within said housing for engaging said threaded stud bolt and for being expanded radially outwardly by said threaded stud bolt when said threaded stud bolt is inserted into said cavity defined within said housing; and
spring means disposed within said cavity defined within said housing for engaging said latch means and for biasing said latch means into engagement with said threaded stud bolt.

13. A stud clip as set forth in claim 12, wherein:
said latch means are integrally mounted upon said wall member of said housing; and
said spring means are integrally mounted upon another wall member of said housing.

14. A stud clip as set forth in claim 13, wherein:
said housing, said latch means, and said spring means comprise a one-piece molding.

15. A stud clip as set forth in claim 14, wherein:
said one-piece molding is fabricated from a synthetic resin material.

16. A stud clip as set forth in claim 12, wherein:
said latch means comprises a pair of oppositely disposed latch members; and said spring means comprises a pair of spring members disposed adjacent to said pair of oppositely disposed latch members.

17. A stud clip as set forth in claim 16, wherein:

each one of said latch members comprises claw means for engaging a threaded shank portion of said threaded stud bolt.

18. A stud clip as set forth in claim 17, wherein:

said claw means comprises a plurality of claw detents disposed within a tiered array.

19. In combination, a stud clip used for securing a first member to a second substrate member, comprising:

a first member having an aperture defined therein;

a second substrate member having a threaded stud bolt projecting outwardly from a surface thereof for insertion through said aperture of said first member;

a housing having an interior cavity defined therein and disposed in contact with said first member;

aperture means defined within a wall of said housing for permitting insertion of a threaded stud bolt into said cavity defined within said housing;

resiliently flexible, radially expandable latch means disposed within said cavity defined within said housing for engaging said threaded stud bolt and for being expanded radially outwardly to a predetermined extent by said threaded stud bolt when said threaded stud bolt is inserted into said cavity defined within said housing such that said radially outward expansion, of said resiliently flexible latch means to said predetermined extent, determines an insertion force characteristic of said stud clip which is necessary to insert said threaded stud bolt into said cavity defined within said housing; and additional means disposed within said cavity defined within said housing for engaging said latch means, resisting further radially outward expansion of said latch means beyond said predetermined extent, and for biasing said latch means with an additional force into engagement with said threaded stud bolt such that said latch means engages said threaded stud bolt with a withdrawal force which is greater than said insertion force determined only by said resiliently flexible latch means.

20. A stud clip as set forth in claim 19, wherein:

said additional means disposed within said cavity defined within said housing comprises spring members disposed adjacent to said latch means.

* * * * *